United States Patent

Swinderman et al.

(10) Patent No.: US 9,139,367 B2
(45) Date of Patent: Sep. 22, 2015

(54) CONVEYOR BELT IDLER ASSEMBLY

(71) Applicant: Martin Engineering Company, Neponset, IL (US)

(72) Inventors: Robert Todd Swinderman, Palm Coast, FL (US); Paul Bernard Harrison, Gauteng (ZA); Richard P. Stahura, Aspen, CO (US)

(73) Assignee: Martin Engineering Company, Neponset, IL (US)

( * ) Notice: Subject to any disclaimer, the term of this patent is extended or adjusted under 35 U.S.C. 154(b) by 184 days.

(21) Appl. No.: 13/625,549

(22) Filed: Sep. 24, 2012

(65) Prior Publication Data

US 2014/0083822 A1 Mar. 27, 2014

(51) Int. Cl.
*B65G 15/08* (2006.01)
*B65G 15/60* (2006.01)
*B65G 15/64* (2006.01)
*B65G 39/10* (2006.01)
*B65G 41/00* (2006.01)
*B65G 39/12* (2006.01)

(52) U.S. Cl.
CPC ............... *B65G 15/08* (2013.01); *B65G 15/60* (2013.01); *B65G 15/64* (2013.01); *B65G 39/125* (2013.01)

(58) Field of Classification Search
None
See application file for complete search history.

(56) References Cited

U.S. PATENT DOCUMENTS

| 3,191,761 | A | * | 6/1965 | Reilly | 198/828 |
| 3,219,177 | A | | 11/1965 | Reilly | |
| 3,230,634 | A | | 1/1966 | Sachs | |
| 4,094,401 | A | | 6/1978 | Sanderson | |
| 5,988,360 | A | | 11/1999 | Mott | |
| 6,634,490 | B2 | | 10/2003 | Fischer et al. | |
| 6,695,131 | B2 | | 2/2004 | Swinderman | |
| 7,448,491 | B1 | * | 11/2008 | Tippery et al. | 198/813 |
| 7,950,520 | B2 | * | 5/2011 | Mott | 198/826 |
| 2002/0046928 | A1 | | 4/2002 | Swinderman | |
| 2004/0079621 | A1 | | 4/2004 | Mott | |

* cited by examiner

*Primary Examiner* — Kavel Singh
(74) *Attorney, Agent, or Firm* — Thompson Coburn LLP; Clyde L. Smith (57) ABSTRACT

A conveyor belt idler assembly comprises support structure, a strand of catenary idler rollers, and an outboard wing roller or slider bar. The strand of catenary idler rollers can take on various trough-shaped contours. The outboard wing roller or slider bar is attached to the support structure and is able to translate relative to the support structure only along a linear path. The translational movement of the outboard wing roller or slider bar along the linear path is at least partial dependent upon changes in the contour of the strand of catenary idler rollers. The structure is adjustable such that the strand of catenary idler rollers can be lowered and raised to facilitate servicing and installation. A plurality of idler assemblies can be connected to each other using connecting brackets that rigidly tie the assemblies to each other near the outermost idler rollers or slider bars.

15 Claims, 6 Drawing Sheets

CONVEYOR BELT IDLER ASSEMBLY

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains to conveyor belt idler assemblies. More specifically, the present invention pertains to conveyor belt idler assemblies of the type used to support trough-shaped bulk material conveyor belts, especially in loading zones.

2. General Background

Bulk material conveyor belts are typically supported by roller and/or slider bar idler assemblies arranged in a trough-shaped manner. In material loading zones, multiple idler assemblies are often arranged in series and in close proximity to each other to form impact cradles or beds that are capable of supporting the impact loads generated by material being loaded onto the belts. Ideally, the trough-shape formed by the idler assemblies should match the theoretical contour that the belt would naturally have given the load distribution on the belt (which, in general, is greatest at the center of the belt and follows a bell-shaped curve transversely across the belt). In actuality however, since the loading conditions on a given belt conveyor change during use, so too does the theoretical ideal profile of the belt. For this and other reasons, some idler assemblies (especially in high-load and/or high-speed applications) utilize what are often referred to as catenary idlers. A catenary idler assembly comprises a strand of several idler rollers and/or slider bars that are flexibly linked to each other. The strands are suspended such that the trough-shape formed by the idler assemblies can adjust in a catenary-like manner as the load distributions on the belt change.

Another driving force behind the design of impact-zone idler assemblies is the need to provide effective sealing. In belt loading zones, dust suppression and spillage are almost always a concern. To address this, conveyor belt systems typically are provided with generally fixed seals that slideably contact the upper surface of the belts near their outboard edges in loading zones. As can be appreciated, better sealing can be achieved by controlling the angular orientation of the outboard edge portions of the belt in the loading zone such that the angular orientations match the angular orientations of the sliding seals. Additionally, it is desirable to minimize belt sag between idler assemblies so that the edge margins of the belt are as linear as possible as the belt passes through the loading zone. These design goals conflict with the design goals of catenary idler assemblies since the goal of catenary idler assemblies is to allow the belt contour to adjust with changes in load distributions. Moreover, catenary idler assemblies generally are spaced farther apart from each other as compared to fixed idler assemblies to accommodate slight swinging of the suspended rollers. Spacing the idler assemblies farther apart can increase the degree of belt sag between the idler assemblies, which decreases belt sealing performance.

To address the conflict between the above-mentioned design goals, idler assemblies have been provided with fixed outboard or wing idler rollers or sliding bars, and with a catenary strand of idler rollers therebetween. In some cases, in addition to the normal flexibility of the catenary string, the catenary string is suspended from spring-biased mounting points to further improve the ability of the rollers to adapt to various contours and to reduce peak impact loads. However, utilizing such spring-biased catenary rollers in combination with fixed wing rollers or slider bars creates another problem. More specifically, as a spring-biased catenary strand of rollers changes the contour of the center of the belt, the outboard edges of the belt must move relative to each other. This means that there is transverse movement of the belt edge margins over the fixed wing idlers, which increases friction and belt wear.

Another problem associated with catenary idler assemblies is that catenary strands of idler rollers are inherently difficult to install or replace due to their flexibility and limp nature and due to the fact that the entire weight of a strand must be counteracted when installing the strand. These difficulties also increase the likelihood of injury to those providing installation or repair services.

SUMMARY OF THE INVENTION

The present invention overcomes some of the problems associated with catenary type idler assemblies. The idler assemblies of the present invention are capable of handling conveyor belts having high loads and high speeds without sacrificing sealing performance or increasing friction. Moreover, the idler assemblies of the present invention are adjustable in a manner simplifying the installation and servicing of such assemblies.

In one aspect of the invention, a conveyor belt idler assembly comprises support structure, a strand of catenary idler rollers, and an outboard wing roller or slider bar. The strand of catenary idler rollers can take on various trough-shaped contours. The outboard wing roller or slider bar is attached to the support structure and is able to translate relative to the support structure only along a linear path. The translational movement of the outboard wing roller or slider bar along the linear path is at least partially dependent upon changes in the contour of the strand of catenary idler rollers.

In another aspect of the invention, a conveyor belt idler assembly comprises support structure, at least three suspended conveyor belt idler rollers, first and second connecting members, and first and second belt support members. The conveyor belt idler rollers are flexibly linked to each other in a chain-like manner and are flexibly linked to the first and second connecting members in a manner such that the conveyor belt idler rollers are suspended from and between the first and second connecting members and hang in a catenary manner from the first and second connecting members. Each of the first and second connecting members are movably attached to the support member in a manner such that said connecting member cannot pivot relative to the support member but can translate along a linear path relative to the support member. The first belt support member is supported by and movable with the first connecting member relative to the support structure. The second belt support member is supported by and movable with the second connecting member relative to the support structure. The first and second belt support members and the conveyor belt rollers collectively form a trough-shape and each is configured and adapted to engage and support a conveyor belt positioned in and moving through the trough-shape.

In yet another aspect of the invention, a conveyor belt idler assembly comprises a strand of catenary idler rollers and support structure. The strand of idler rollers is attached to the support structure. The support structure is adjustable between an operation configuration and a servicing configuration. The strand of idler rollers is suspended from the support structure when the support structure is in the operation configuration, but rests on the support structure when the support structure is in the servicing configuration.

In still another aspect of the invention, an impact cradle comprises at least two conveyor belt idler assemblies arranged in series and in close proximity. Each idler assembly comprises support structure and a plurality of idler rollers and/or slider bars arranged in a trough-shape. The idler rollers and/or slider bars include opposite outermost idler rollers or slider bars. The connecting brackets rigidly tie adjacent portions of the support structures of adjacent conveyor belt assemblies to each other. The adjacent portions are proximate to the outermost idler rollers or slider bars.

Further features and advantages of the present invention, as well as the operation of the invention, are described in detail below with reference to the accompanying drawings.

Reference numerals in the written specification and in the drawing figures indicate corresponding items.

DETAILED DESCRIPTION

A preferred embodiment of an idler assembly in accordance with the present invention is shown in the figures and is indicated by the numeral 10. The idler assembly 10 comprises support structure 12, wing rollers 14, and a strand of rollers 16.

Figure 4:
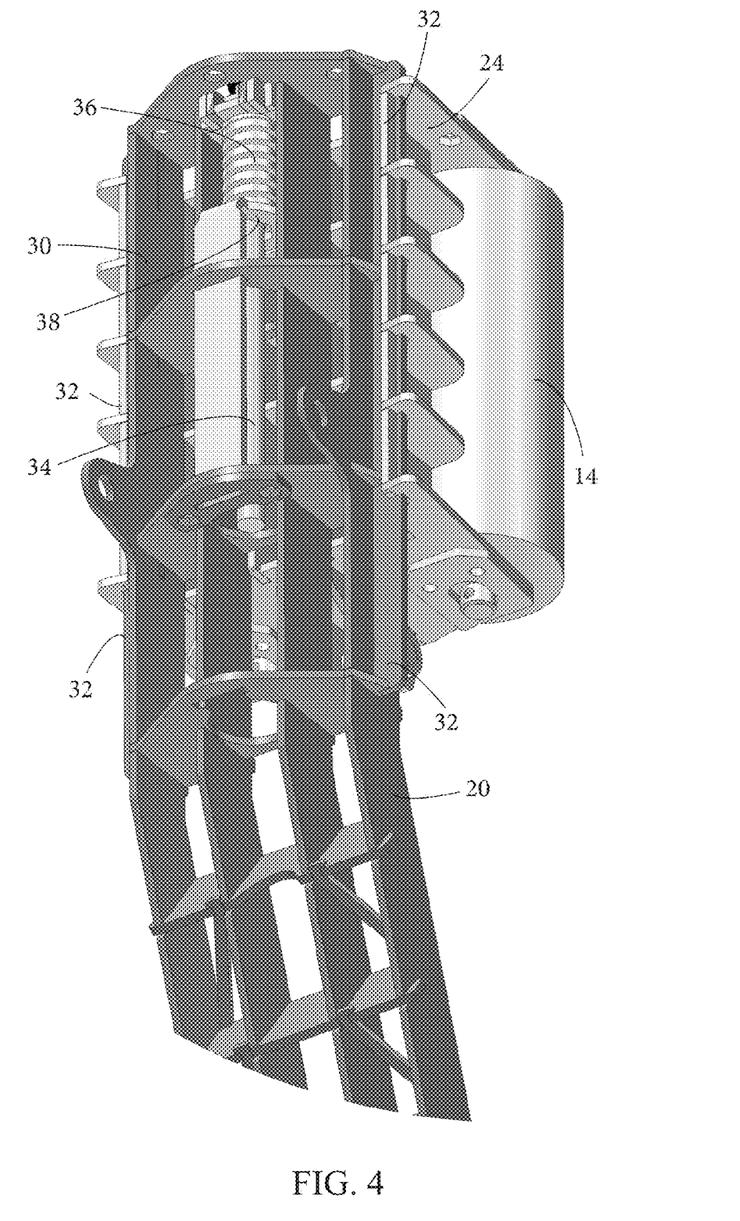
FIG. 4 depicts a detail view of the idler assembly shown in FIGS. 1-3, showing the underside of the distal portion of one of its support arms.

The support structure 12 comprises a base 18, a pair of support arms 20, a pair of adjustable braces 22, a pair of spring biased movable carriages 24, and a hydraulic actuator 26. The support structure 12 (excluding the hydraulic actuator 26) is formed primarily of laser cut pieces of steel that are interlocked with each other and that are thereafter welded together. Each of the support arms 20 comprises a proximal portion 28 that is pivotally attached to the base 18 near the center of the base. In normal operation, the support arms 20 extend upward and outward from the base 18 and are held in that upright configuration by the adjustable braces 22. Each of the adjustable braces 22 is attached to the base 18 and to the distal portion 30 of a respective one of the support arms 20. Each carriage 24 is slideably attached to the distal portion 30 of a respective one of the support arms 20 in a manner such that the carriage is able to translate along an axis relative to the distal portion, but is otherwise constrained by the support arm. Those axes are defined by railing components 32 that secure the carriages 24 to the support arms 20. The distal portion 30 of each support arm 30 also comprises a threaded rod 34, a compression spring 36, and an adjustable spring stop 38 (see FIG. 4). The threaded rod 34 acts as an adjustment screw that repositions the spring stop 38 along the axis of the rod. The compression spring 36 is sandwiched between the spring stop 38 and the carriage 24 in a manner such that movement of the carriage 24 toward the center of the idler assembly 10 relative to the distal portion 30 of the respective support arm 20 is resisted by the spring. Preferably, each compression spring 36 has a stiffness of 2200 lbs/inch and allows for a maximum compression of only one inch. Thus, in normal operation (as is further described below), the carriage 24 is able to move linearly relative to the support arm 20, but only by a relatively small amount.

Figure 1:
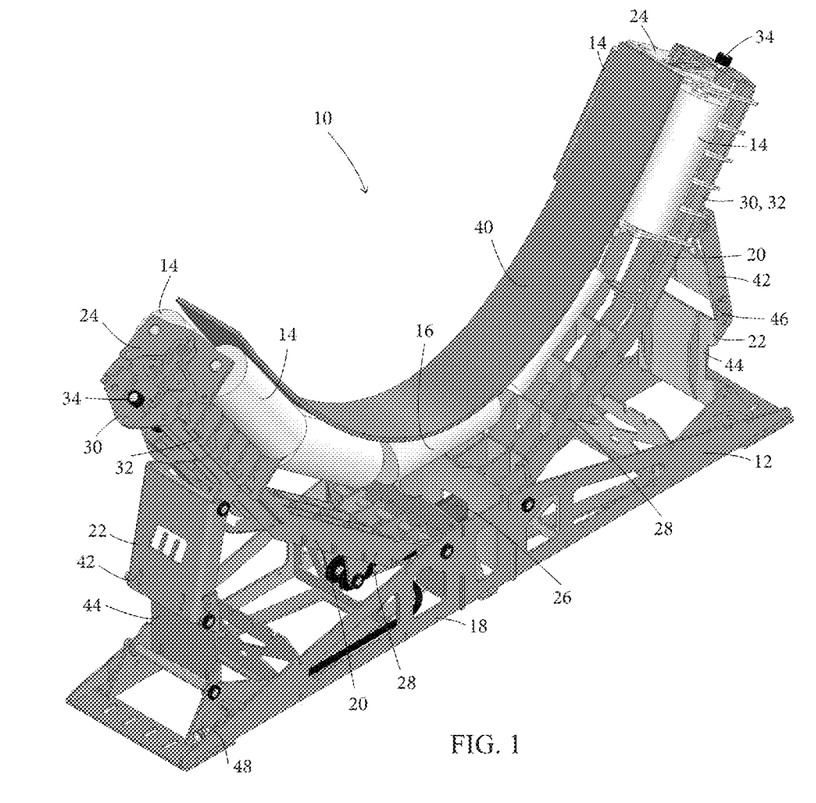
FIG. 1 depicts a perspective view of an embodiment of an idler assembly in accordance with the present invention, and shows the idler assembly in its operation condition.

The support structure 12 supports the wing rollers 14 and the strand of rollers 16 as shown in FIG. 1. Preferably, each carriage 24 has two wing rollers 14 attached to it in a manner such that the wing rollers 14 are movable with the carriage relative to the respective support arm 20. The two wing rollers 14 are positioned side-by-side in a non-collinear manner and are able to rotate about axes that are preferably oriented parallel to the linear moveability of the carriage 24 relative to the respective support arm 20. The strand of rollers 16 is suspended from and between the carriages 18 in a manner such that the strand of rollers hangs from the carriages in a catenary-like manner. The individual rollers of the strand of rollers 16 are preferably connected to each other via chain links in a manner to provide one degree of rotational freedom between them. Each of the opposites ends of the strand of rollers 16 are preferably connected to the respective carriage 24 via two chain links that provide two degrees of rotational freedom and that functions like a universal joint. Preferably the strand of rollers 16 is centered along the direction of belt travel between the two wing rollers 14 of each carriage 24.

In normal operation, an endless conveyor belt 40 (shown in FIG. 1 represented by only a small portion of the belt) rides in the trough formed by the wing rollers 14 and the strand of rollers 16. As vertical loads on the conveyor belt 40 vary, the compression springs 36 compress and decompress in a manner moving the carriages 24 slightly such that the peak load experienced by the strand of rollers 16 is far less than it would be if the strand of rollers was suspending from fixed points. This of course moves the belt 40 up and down slightly along its centerline. Because the wing rollers 14 move with the carriages 24, the belt 40 does not need to slip over the wing rollers (i.e., slide over the rollers in direction parallel to the rotational axes of the rollers). This reduces friction as compared to if the wing rollers 14 were fixed in place. Still further, because the wing rollers 14 are each only capable of translating along a linear path with the respective carriage 24, the angles of orientation of the wing rollers 14 (in the plane that is perpendicular to the direction of belt travel) remain constant. That in turn ensures that the end margins of the belt 40 will maintain the proper angular and vertical orientations to effectuate proper belt sealing despite the fact that the belt contour is able to adjust.

Figure 2:
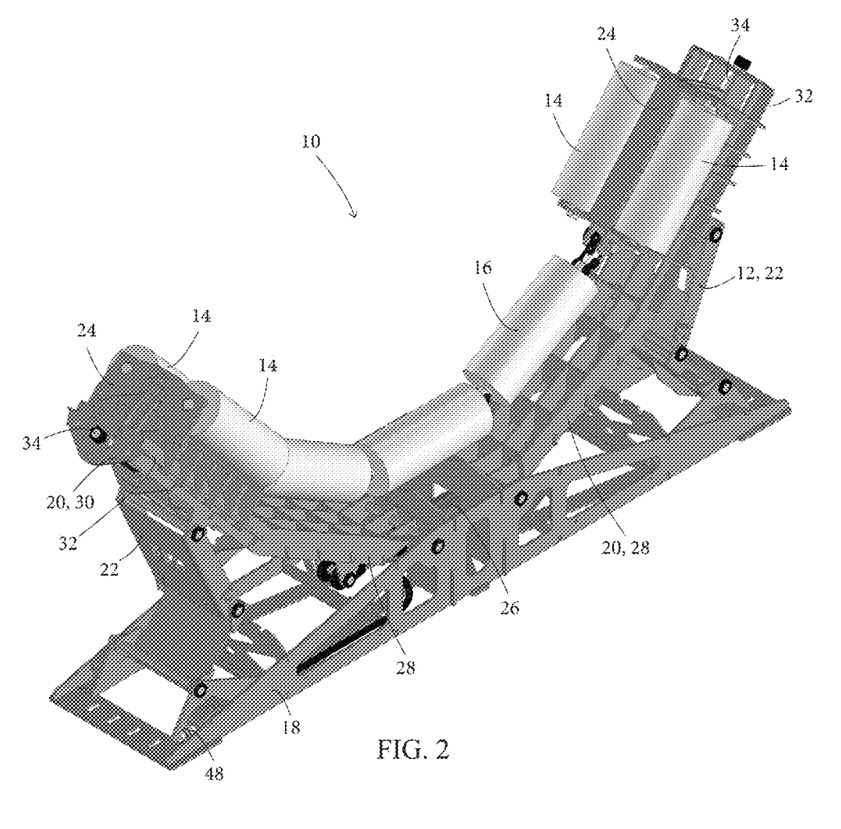
FIG. 2 depicts a perspective view of the idler assembly shown in FIG. 1, and shows the idler assembly between its operation condition and servicing condition.
Figure 3:
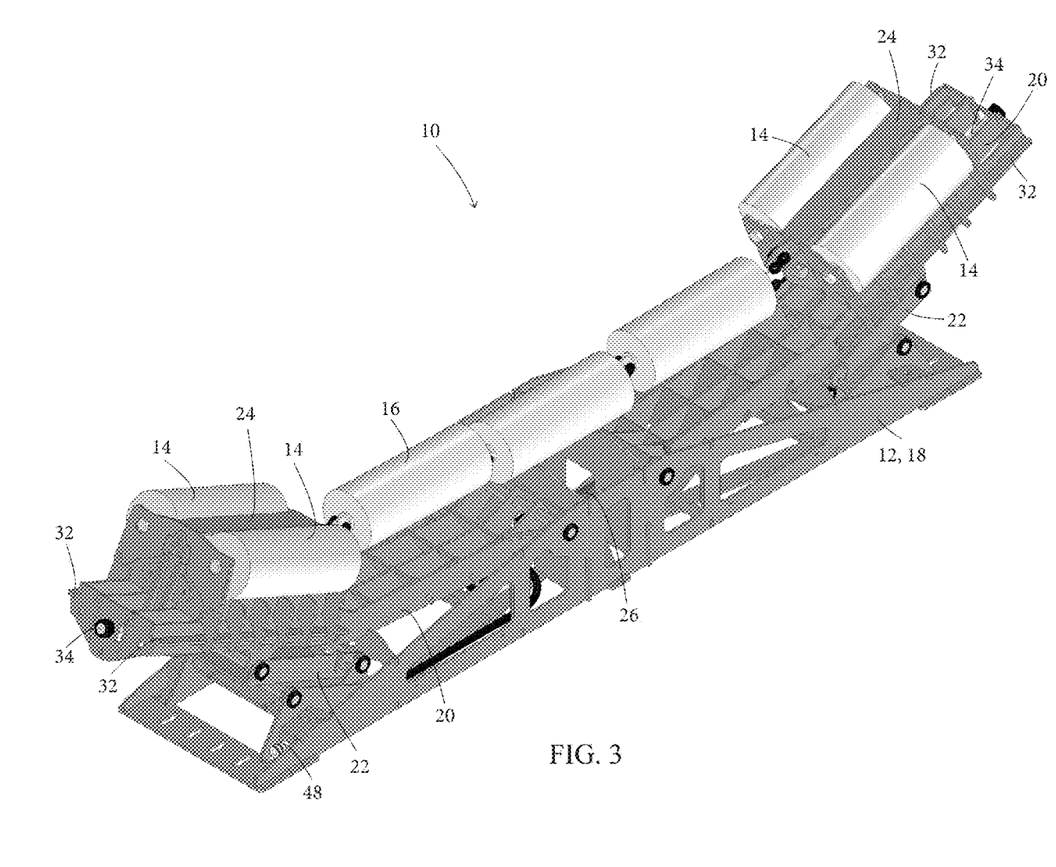
FIG. 3 depicts a perspective view of the idler assembly shown in FIGS. 1 and 2, and shows the idler assembly in its servicing condition.
Figure 5:
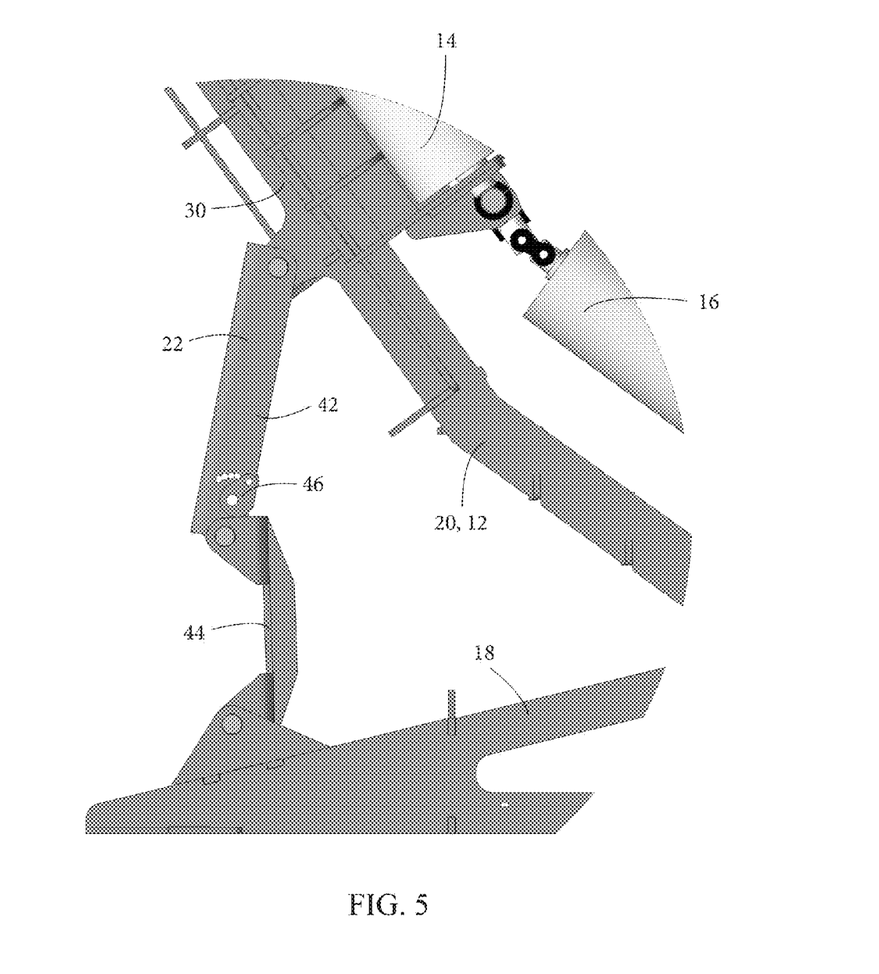
FIG. 5 depicts a detail elevation view of the idler assembly shown in FIGS. 1-3, showing a close-up of one of its adjustable braces.

When servicing or installing the idler assembly 10, the support arms 20 of the support structure 12 can be lowered, which greatly facilitates such servicing or installation. To lower the support arms 20, the support arms are initially raised slightly so that the adjustable braces 22 that normally hold up the support arms can be released. The adjustable braces 22 operate as over-center locking mechanisms. Each of the adjustable braces 22 (shown in isolation in FIG. 5) preferably comprises an upper member 42, a lower member 44, and an adjustable cam 46. The upper and lower members 42, 44 are pivotally connected to each other. The upper member 42 is pivotally connected to the respective support arm 20, and the lower member 44 is pivotally connected to the base 18 of the support structure 12. The adjustable cam 46 limits the degree to which the upper and lower members 42, 44 can pivot relative to each other. Thus, when the hinge axis about which the upper and lower members 42, 44 connected to each other lies outboard (as shown in FIG. 1 and as it does in normal operation), the cam 46 prevents the adjustable brace 22 from collapsing and the bracket 22 can therefore support the vertical load acting on the support arm 20. But when the support arm 20 is raised slightly, the hinge axis can be forced inboard, which allows the bracket 22 to ultimately collapse, as is shown in FIGS. 2 and 3. It should also be appreciated that the cam 46 is adjustable in a manner such that the maximum outboard angle between the upper and lower members 42, 44 can be adjusted to finely control how high the support arm 20 is held during normal operation. This simplifies the process of properly aligning the idler assembly 10 with other components of a belt conveyor system.

To facilitate the raising and lowering of the support arms 20, a technician preferably operates the hydraulic actuator 26 of the support structure 12. To pressurize the hydraulic actuator 26, a technician preferably attaches a manual or battery operated hydraulic pump to a quick disconnect fitting 48 that is provided on the support structure 12. Before lowering the support arms 20 however, a technician preferably also actuates the threaded rods 34 on the distal portion 30 of each support arm 20 to move the spring stops 38, and therefore also the carriages 24, inboard. This provides additional slack in the catenary strand of rollers 16 to ensure that the strand of rollers 16 won't be drawn taut as the support arms 20 are lowered. With the support arms 20 lowered, technicians are able to install or replace the rollers of the idler assembly 10. Moreover, as shown in FIG. 3, when the support arms 20 are lowered, the strand of rollers 16 can rest partially on the base 18 of the support structure 20. This makes it much easier to replace the rollers of the strand of rollers 16 or to install a new strand of rollers since the strand needs not be serviced or installed while it is suspended.

Figure 6:
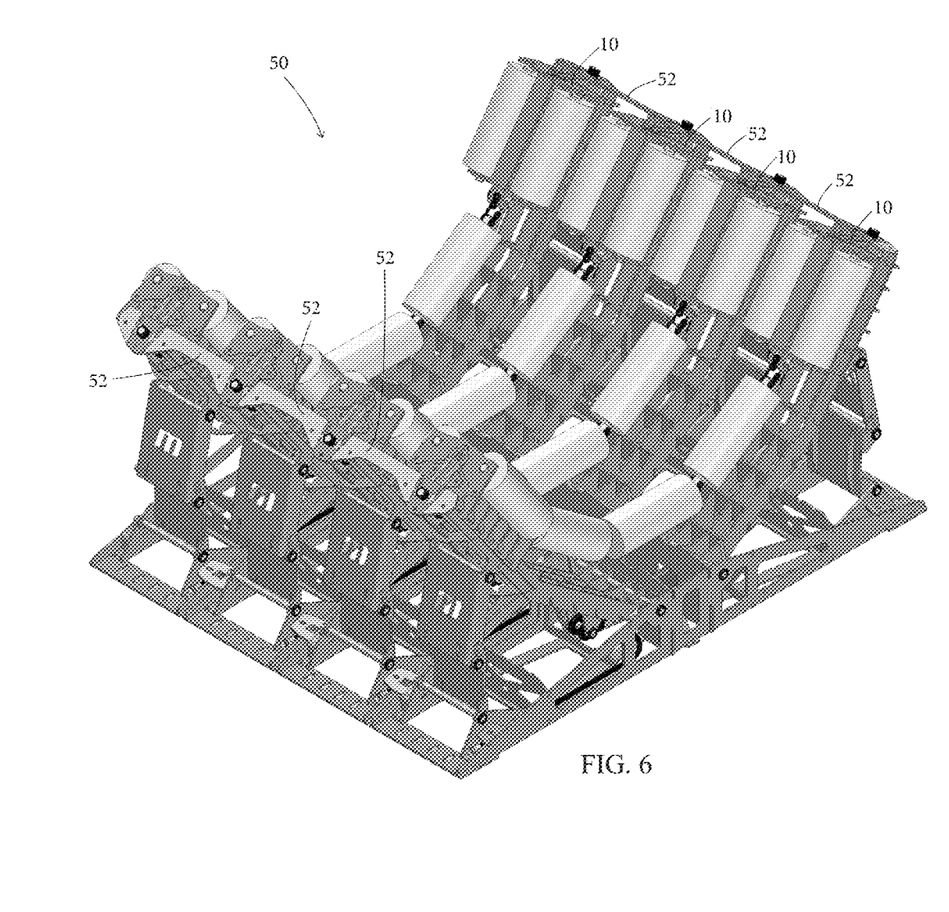
FIG. 6 depicts a perspective view of an assembly of four idler assemblies of the type shown in FIGS. 1-3.

As shown in FIG. 6, a plurality of the idler assemblies 10 can be arranged in series to form an impact cradle 50. As mentioned above, like in prior art catenary impact cradles, the impact assemblies 10 are configured such that the strands of rollers 16 are spaced apart by a sufficient distance to allow the strands of rollers 16 to swing slightly. Notably however, by providing two wing rollers 14 on each support arm 20 of each idler assembly 10, the wing rollers are tightly spaced. This greatly reduces belt sag between the wing rollers 14 and thereby improves belt sealing. Additionally, to further improve belt sealing, the idler assemblies are preferably interlocked together via brackets 52 that lock the distal portions 30 of the support arms 20 together along each side of the impact cradle 50. By interlocking the support arms 20 in this manner, the support arms 20 deflect less, both vertically and in the direction of belt travel, and this further improves belt sealing.

In view of the foregoing, it should be appreciated that the invention has several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. For example, it should be appreciated that low friction slider bars could be used in place of the wing rollers, which would eliminate belt sag in sealing areas at the costs of greater friction. Additionally, as another example, other structure could be used in place of the carriages to achieve the linear moveability of the wing rollers or slider bars. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed, unless such an order is inherent.

What is claimed is:

1. A conveyor belt idler assembly comprising:
   support structure;
   at least three suspended conveyor belt idler rollers and first and second connecting members, the conveyor belt idler rollers being flexibly linked to each other in a chain-like manner and flexibly linked to the first and second connecting members in a manner such that the conveyor belt idler rollers are suspended from and between the first and second connecting members and hang in a catenary manner from the first and second connecting members, each of the first and second connecting members being movably attached to the support structure in a manner such that said connecting member cannot pivot relative to the support structure but can translate along a linear path relative to the support structure;
   at least first and second belt support members, the first belt support member being supported by and linearly movable with the first connecting member relative to the support structure, the second belt support member being supported by and linearly movable with the second connecting member relative to the support structure, the first and second belt support members and the conveyor belt idler rollers collectively forming a trough-shape and each being configured and adapted to engage and support a conveyor belt positioned in and moving through the trough-shape.

2. A conveyor belt idler assembly in accordance with claim 1 wherein the first and second belt support members are first and second non-suspended conveyor belt rollers, respectively, the first non-suspended conveyor belt roller being pivotal about a pivot axis that is fixed in relation to the first connecting member, the second non-suspended conveyor belt roller being pivotal about a pivot axis that is fixed in relation to the second connecting member.

3. A conveyor belt idler assembly in accordance with claim 2 wherein the pivot axis of the first non-suspended conveyor belt roller is parallel to the linear path along which the first connecting member is able to translate relative to the support structure, and the pivot axis of the second non-suspended conveyor belt roller is parallel to the linear path along which the second connecting member is able to translate relative to the support structure.

4. A conveyor belt idler assembly in accordance with claim 2 further comprising third and fourth non-suspended conveyor belt rollers, the third non-suspended conveyor belt roller being pivotal about a pivot axis that is fixed in relation to the first connecting member, the fourth non-suspended conveyor belt roller being pivotal about a pivot axis that is fixed in relation to the second connecting member, the first and third non-suspended conveyor belt rollers being side-by-side in a manner such that their respective pivot axes are parallel and non-collinear, the second and fourth non-suspended conveyor belt rollers being side-by-side in a manner such that their respective pivot axes are parallel and non-collinear.

5. A conveyor belt idler assembly in accordance with claim 1 wherein the support structure is adjustable between an operation configuration and a service configuration, the operation configuration is that which accomplishes the functions of the support structure as recited in claim 1, the support structure comprises a base, opposite first and second support arms, and first and second adjustable braces, the first and second support arms each comprise a proximal portion that is pivotally connected to the base, the first and second support arms also each comprise a distal portion that can be raised and lowered relative to the base by pivoting said support arm relative to the base, the first and second adjustable braces are configured to releasably lock and hold the first and second support arms, respectively, in their raised configuration to place the support structure in the operation configuration, the first connecting member is supported by the distal portion of the first support arm, and the second connecting member is supported by the distal portion of the second support arm.

6. A conveyor belt idler assembly in accordance with claim 5 further comprising at least one hydraulic actuator configured and adapted to pivot the first and second support arms relative to the base.

7. An assembly comprising at least two connecting brackets and a series of at least two conveyor belt idler assemblies as set forth in claim 5, each of the distal portions of the support arms of the conveyor belt idler assemblies comprising a distal end, the connecting brackets rigidly tying at least some of the distal ends to each other.

8. A conveyor belt idler assembly in accordance with claim 1 further comprising at least two springs, the translation movement of the connecting members relative to the support structure being opposed by the springs, which resiliently deform when the connecting members translate relative to the support structure.

9. A conveyor belt idler assembly in accordance with claim 8 wherein the springs can selectively be translated relative to the support structure to manually translate the connecting members relative to the support structure.

10. A conveyor belt idler assembly comprising:
support structure;
a strand of catenary idler rollers that can take on various trough-shaped contours; and
an outboard wing roller or slider bar; the outboard wing roller or slider bar being attached to the support structure and being able to translate relative thereto only along a linear path, translational movement of the outboard wing roller or slider bar along the linear path is at least partially dependent upon changes to the contour of the strand of catenary idler rollers.

11. A conveyor belt idler assembly in accordance with claim 10 wherein the outboard wing roller or slider bar is a wing roller and is configured to rotate about an axis, the axis being fixed parallel to the liner path.

12. A conveyor belt idler assembly in accordance with claim 10 wherein the support structure is adjustable between an operation configuration and a servicing configuration, the strand of idler rollers are suspended from the support structure when the support structure is in the operation configuration, and the strand of idler rollers at least partially rest on the support when the support structure is in the servicing configuration.

13. A conveyor belt idler assembly in accordance with claim 12 wherein the support structure comprises a base, and opposite first and second support arms, the first and second support arms each comprise a proximal portion that is pivotally connected to the base and a distal portion that can be raised and lowered relative to the base by pivoting said support arm relative to the base, the distal portions of the support arms being in a raised configuration and the strand of idler rollers being suspended from the distal portions of the support arms when the support structure is in the operation configuration; the distal portions of the support arms being in a lowered configuration when the support structure is in the servicing configuration.

14. A conveyor belt idler assembly in accordance with claim 13 wherein the support structure comprises a hydraulic actuator that is configured and adapted to pivot the support arms relative to the base of support structure.

15. A conveyor belt idler assembly in accordance with claim 13 wherein the support structure comprises first and second adjustable braces that are configured to releasably lock and hold the first and second support arms, respectively, when the support structure is in the operation condition.

\* \* \* \* \*